Feb. 28, 1967 K. W. GOODPASTURE 3,306,221
MAGNET DRIVE PLASTIC PUMP
Filed May 18, 1965
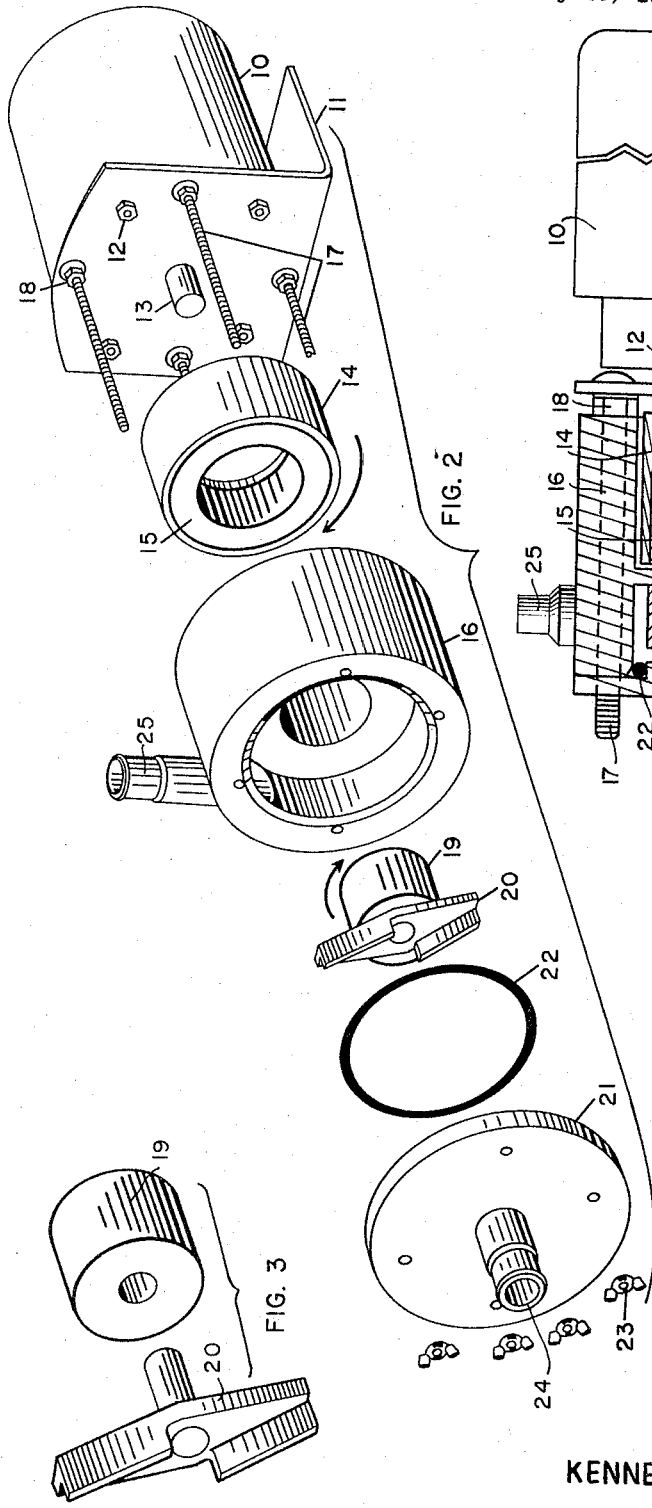
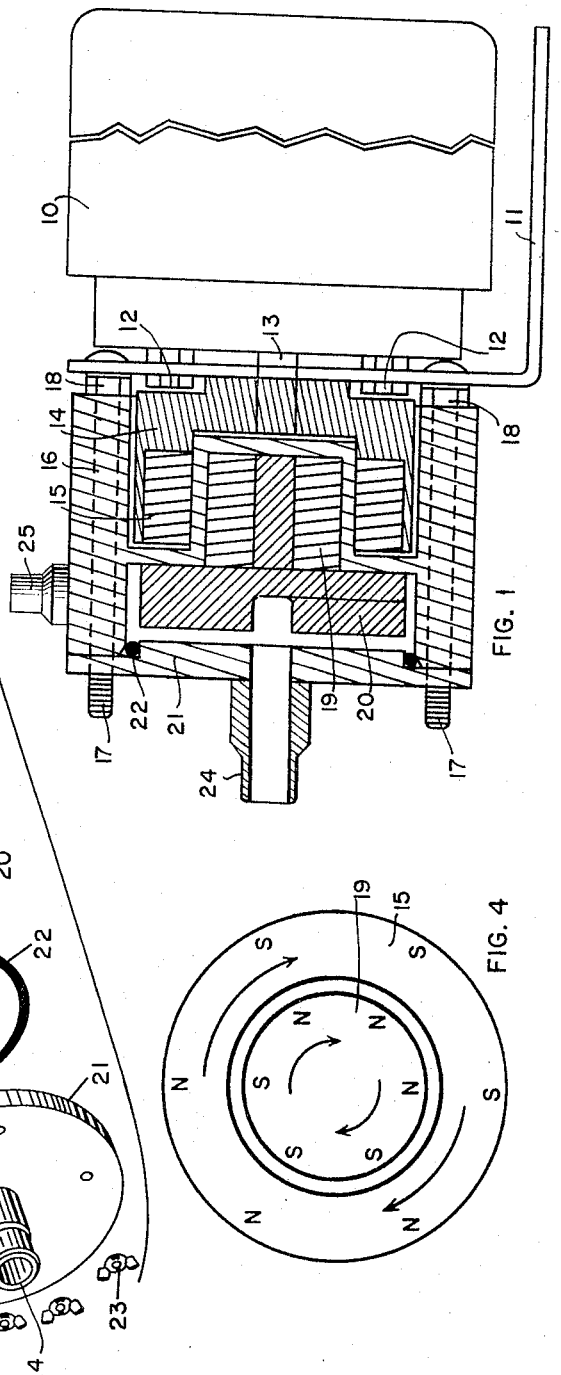
INVENTOR.
KENNETH WAYNE GOODPASTURE
BY ized with a corresponding number of poles on the outside diameter. When driver magnet 15 is placed over and circumvents driven magnet 19 a radial drive is formed by the attraction of unlike poles north and south respectively. This magnetic flux is transmitted through the plastic walls of the pump body 16 and makes a non-mechanical connection between the driven magnet 19 and the driver magnet 15.

United States Patent Office 3,306,221
Patented Feb. 28, 1967

3,306,221
MAGNET DRIVE PLASTIC PUMP
Kenneth Wayne Goodpasture, 623 W. Colfax St., Palatine, Ill. 60067
Filed May 18, 1965, Ser. No. 457,229
2 Claims. (Cl. 103—87)

This invention relates to a pumping device and more particularly to a pump designed to pump corrosive or food type liquids.

It is the object of the present invention to provide a simple economical means of pumping corrosive liquids without leakage or corrosion to the pump.

Another object of my invention is to produce a pump that can be serviced without tools and is not costly to repair.

Still another object of my invention is to produce a pump with few moving parts that can wear.

Still a further object of my invention is to produce a pump that can be mass produced in large quantities at low cost.

Still additional objects, benefits, and advantages of my invention will become evident from a study of the following detailed description taken in conjunction with the accompanying drawings, in which:

FIGURE 1 is a side sectional view of the pump apparatus as an assembly.

FIGURE 2 is an exploded view showing all components and how they look before assembly.

FIGURE 3 shows an exploded view of the driven magnet and impeller assembly.

FIGURE 4 shows the driver and driven magnet and how they work together to make a radial drive.

Referring now specifically to FIGURES 1 and 2, I have an electric motor 10 which is mounted by means of projecting studs and nuts 12 to a bracket 11 which supports both the pump and motor. Ceramic magnet 15 known as the driver magnet is cemented into and surrounded by a non-magnetic type, such as aluminum, magnet driver 14. Magnet driver 14 is in turn secured to motor shaft 13 which causes the entire assembly of driver magnet 15 and magnet driver 14 to rotate when the motor is turned on. This rotation will normally be in a clockwise direction. Now energy is provided to drive the pump by means of magnetic flux which I will explain later.

Pump body 16, which is moulded of polypropylene or other suitable plastic materials, is now assembled to bracket 11 by inserting mounting studs 17, which are stainless screws secured by nuts 18, into the holes in pump body 16 and sliding pump body 16 all of the way back until the back of pump body 16 is resting against nuts 12 on bracket 11. Now driven magnet 19, which is ceramic material and moulded plastic impeller 20 as an assembly, is inserted into the compartment provided in pump body 16. FIGURE 3 is an exploded view of the previously described assembly. At this time driven magnet 19 and driver magnet 15 will fall into magnetic step.

FIGURE 4 illustrates how driver magnet 15 is magnetized with six or more poles, in some cases, on the inside diameter and how driven magnet 19 is magnetized with a corresponding number of poles on the outside diameter. When driver magnet 15 is placed over and circumvents driven magnet 19 a radial drive is formed by the attraction of unlike poles north and south respectively. This magnetic flux is transmitted through the plastic walls of the pump body 16 and makes a non-mechanical connection between the driven magnet 19 and the driver magnet 15.

O-ring gasket 22 is now slipped over a shoulder comprising a portion of suction head 21, with suction head 21 being inserted into pump body 16 and projecting studs 17 protruding through corresponding holes provided in suction head 21. Wing nuts 23 are now screwed on studs 17 and tightened until snug.

The operation of this device will now be readily understood. As the motor rotates, the impeller 20 will also rotate in the same clockwise direction and cause liquid, which enters into suction head 21 by way of inlet port 24, to be pumped in the usual fashion of a centrifugal pump and be discharged from pump body 16 through outlet port 25.

My novel pump has many advantages over existing art in that there are no rotating members going through the pump housing to cause leaks which cannot be stopped with the best af seals. It also has no metal parts which are wetted by the liquid being pumped. The driven magnet acts as the shaft which is located inside of the pump. This magnet is inert to most chemicals and because of its extreme hardness resists wear. Ceramic magnets are permanent, loosing their magnetism at the rate of 5% every 100 years. With my novel pump, chemical solutions may be pumped with no loss of material and very little corrosion to the pump will result. The self lubricating qualities of the plastic in which the magnet runs will resist wear. When wear does occur simple replacement of the pump body bill restore the pump to new condition. My pump may also be easily taken apart and sterilized if necessary when handling food materials.

While this invention has been described with particular reference to the construction shown in the drawing and while various changes may be made in detail construction, it shall be understood that such changes shall be within the spirit and scope of the present invention as defined by the appending claims.

Having thus completely and fully described the invention, what is now claimed as new and desired to be protected by Letters Patent of the United States is:

1. A centrifugal pump of the class described comprising of a plastic body having an outlet port and a plastic suction head having an inlet port together providing a pumping chamber and a magnet compartment, a rotatable magnetically influenced ceramic magnet located in such compartment with a plastic impeller secured to and driven by same such ceramic magnet which in turn becomes the internal shaft of the pump and the magnet compartment of the plastic body becomes the sole bearing for said magnet.

2. A centrifugal pump of the class described comprising of a plastic body having an outlet port and a plastic suction head having an inlet port together providing a pumping chamber and a magnet compartment, a rotatable magnetically influenced ceramic magnet, magnetized six or more poles on the outside diameter, located in said compartment with a plastic impeller secured to and driven by same such ceramic magnet, said compartment in turn becoming the sole bear for said ceramic magnet, a motor having a drive shaft, a bracket to support both said pump and motor, a ceramic magnet magnetized six or more poles on the inside diameter and located concentrically about the magnet compartment, attached to said motor shaft to become rotatable by same and with same to energize pump by transmitting magnetic flux through the walls of the plastic pump body into the internal driven ceramic magnet.

References Cited by the Examiner
UNITED STATES PATENTS 2,366,562  1/1945  Shug _____ 230—117
3,205,827  9/1965  Zimmerman _____ 103—87

ROBERT M. WALKER, *Primary Examiner.*